(12) United States Patent
Buettner et al.

(10) Patent No.: US 8,877,059 B2
(45) Date of Patent: Nov. 4, 2014

(54) SEPARATION OF ORGANOSILICON COMPOUNDS FROM WASTEWATER

(75) Inventors: Ulrike Buettner, Bobersen (DE); Susanne Kutz, Riesa (DE); Winfried Mueller, Nuenchritz (DE)

(73) Assignee: Wacker Chemie AG, Munich (DE)

( * ) Notice: Subject to any disclaimer, the term of this patent is extended or adjusted under 35 U.S.C. 154(b) by 318 days.

(21) Appl. No.: 13/256,515

(22) PCT Filed: Mar. 3, 2010

(86) PCT No.: PCT/EP2010/052688
§ 371 (c)(1),
(2), (4) Date: Oct. 5, 2011

(87) PCT Pub. No.: WO2010/105907
PCT Pub. Date: Sep. 23, 2010

(65) Prior Publication Data
US 2012/0046487 A1    Feb. 23, 2012

(30) Foreign Application Priority Data

Mar. 17, 2009  (DE) .......................... 10 2009 001 613

(51) Int. Cl.
| C02F 1/60 | (2006.01) |
| C02F 1/02 | (2006.01) |
| C02F 1/40 | (2006.01) |
| C02F 1/52 | (2006.01) |
| C02F 103/38 | (2006.01) |
| C02F 101/32 | (2006.01) |

(52) U.S. Cl.
CPC ... *C02F 1/02* (2013.01); *C02F 1/40* (2013.01); *C02F 1/52* (2013.01); *C02F 2209/44* (2013.01); *C02F 2103/38* (2013.01); *C02F 2101/325* (2013.01)
USPC ............ 210/639; 210/634; 556/466; 556/467

(58) Field of Classification Search
USPC ............ 422/900; 556/466, 467; 210/634, 639
See application file for complete search history.

(56) References Cited

U.S. PATENT DOCUMENTS

| 3,186,551 | A | | 6/1965 | Dornauf |
| 3,855,124 | A | | 12/1974 | Lapidot |
| 3,931,011 | A | | 1/1976 | Richards et al. |
| 4,111,798 | A | * | 9/1978 | Peterson et al. ........... 209/172.5 |
| 5,910,234 | A | | 6/1999 | Mautner et al. |
| 6,068,779 | A | * | 5/2000 | Dzhragatspanyan et al. . 210/799 |
| 6,299,780 | B1 | | 10/2001 | Freshour et al. |
| 6,332,987 | B1 | * | 12/2001 | Whitney et al. ............... 210/799 |
| 6,422,396 | B1 | * | 7/2002 | Li et al. ......................... 210/489 |
| 7,413,657 | B1 | * | 8/2008 | Thundyil et al. .............. 210/634 |

FOREIGN PATENT DOCUMENTS

| DE | 1134785 | | 8/1962 |
| DE | 2436080 | A1 | 5/1975 |
| DE | 2804968 | A1 | 8/1978 |
| DE | 19638123 | A1 | 3/1998 |

OTHER PUBLICATIONS

Klofutar et al; Acta Chimica Slovenica; 1998,45(1), 69-77.*
Teixeira et al., "Degradation of an aminosilicone polymer in a water emulsion by the Fenton and the photochemically enhanced Fenton reactions", Chemical Engineering and Processing, vol. 44, pp. 923-931 (2005).
International Search Report for PCT/EP2010/052688 dated Apr. 19, 2010.
PatBase abstract for DE 2804968, 1978.

* cited by examiner

*Primary Examiner* — Sudhakar Katakam
*Assistant Examiner* — Pancham Bakshi
(74) *Attorney, Agent, or Firm* — Caesar, Rivise, Bernstein, Cohen & Pokotilow, Ltd.

(57) ABSTRACT

The invention relates to a method for separating organosilicon compounds from organosilicon wastewater. In the first step, the wastewater is heated to at least 10° C. In the second step, the wastewater is stored for at least 30 minutes at at least 10° C. In the third step, the wastewater is conducted through a phase separation element, in which droplets that are formed and contain organosilicon compounds are separated.

10 Claims, 1 Drawing Sheet

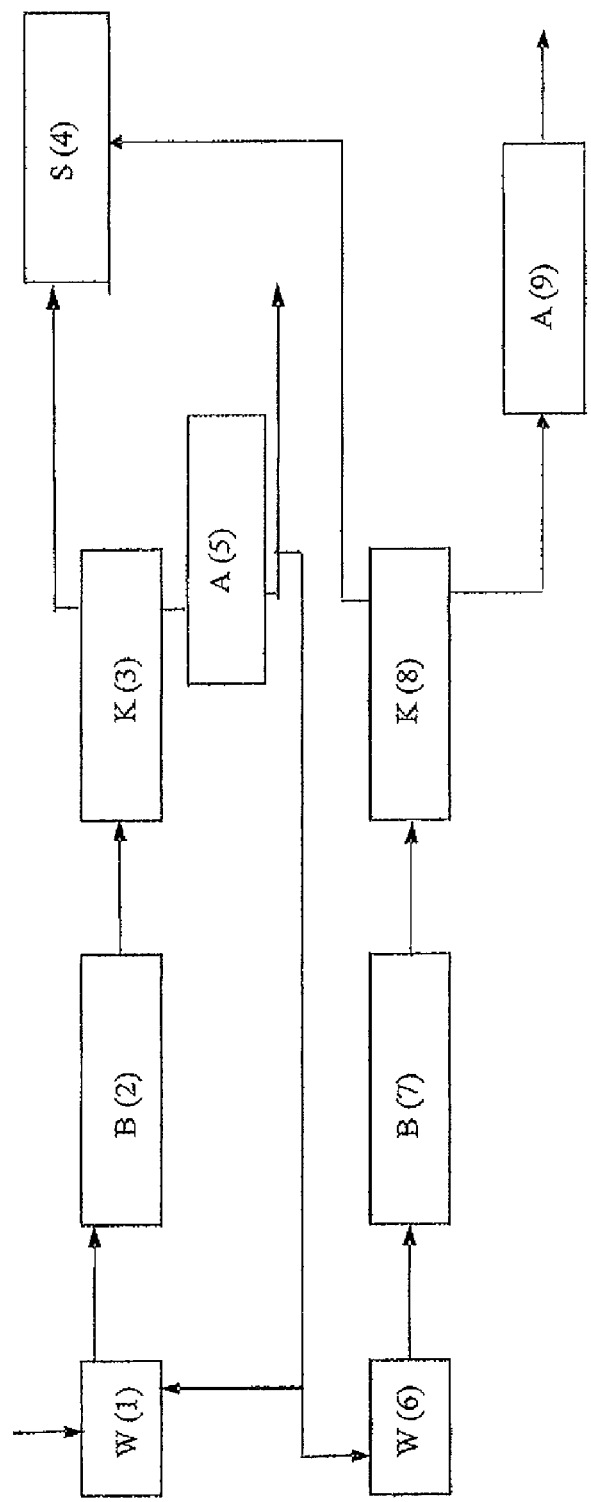

SEPARATION OF ORGANOSILICON COMPOUNDS FROM WASTEWATER

BACKGROUND OF THE INVENTION

The invention relates to a method for separating off organosilicon compounds from wastewater containing organosilicon compounds.

In hydrolysis processes using silanes, as in siloxane production, wastewaters containing organosilicon compounds are produced. The organosilicon compounds contained in the water are not biodegradable and cause what is termed persistent COD (chemical oxygen demand). Persistent COD in wastewater must be avoided for environmental protection reasons.

Ozonolysis is a known method for the degradation of persistent COD from wastewater, but has high operating costs and leads to loss of the organosilicon compounds. The adsorption of organosilicon compounds to silica gel is likewise known, but regeneration thereof is not possible. Therefore, here also high costs arise and the organosilicon compounds are lost.

In DE 113478, DE 2436080 and DE 2804968, methods and devices are described by which liquid/liquid phases can be separated. Using the phase separation elements described, only the droplets of the organosilicon compounds can be separated off from the wastewater. The important fraction of organosilicon compounds dissolved in wastewater cannot be separated in this manner.

SUMMARY OF THE INVENTION

The invention relates to a method for separating off organosilicon compounds from wastewater containing organosilicon compounds, in which, in the first step, the wastewater is warmed to at least 10° C., the wastewater in a second step is kept at at least 10° C. for at least 30 minutes and the wastewater, in a third step, is passed through a phase separation element in which the droplets that are formed and which contain organosilicon compounds are separated off.

In the first and second steps, from organosilicon compounds dissolved in the wastewater, droplets are formed which, in the third step, are separated off by a device which is known per se for separating off droplets. Even organosilicon compounds that are dissolved in the wastewater can be separated off from the wastewater thereby. In particular, short-chain organosilicon compounds react to form long-chain organosilicon compounds. The chemical reaction can be identified visually by precipitation of organosilicon compounds from the solution. This leads to an increased recovery of organosilicon compounds which can be reutilized. At the same time, the persistent COD in the wastewater is decreased.

DETAILED DESCRIPTION OF PREFERRED EMBODIMENTS

Using the method it is possible to treat various types of wastewater which contain organosilicon compounds. In the production of siloxanes by hydrolysis of methylchlorosilanes with water, wastewater is produced. The dimethylsilanediol formed in the hydrolysis, for example, is water-soluble and remains in the wastewater. During this hydrolysis, hydrogen chloride is also produced which is reused for producing methyl chloride from methanol. The hydrogen chloride contains methylchlorosilanes and hydrolysis and condensation products thereof. These organosilicon compounds also pass into the water formed in the production of methyl chloride. Both wastewaters have in common the fact that they contain dissolved hydrochloric acid.

Organosilicon compounds in the wastewater are, for example, dimethylsilanediol, cyclic polydimethylsiloxanes of 3 to 8 dimethylsiloxane units, linear polydimethylsiloxanes and branched polysiloxanes having hydroxyl, alkoxy and alkyl radicals.

The polydimethylsiloxanes are virtually water-insoluble. They are present in the wastewater as very finely distributed drops. Dimethylsilanediol is highly water-soluble; the solubility thereof is temperature-dependent.

As a preferred measuring method for determining organosilicon compounds in the wastewater, there serves the $^1$H-NMR determination of the methyl group on the Si, the measured values are preferably reported as $CH_3$—(Si) in mg/kg in the wastewater and serve as a measure of the persistent COD.

The highly water-soluble dimethylsilanediol condenses readily in the presence of hydrochloric acid to form cyclic and linear polydimethylsiloxanes.

Preferably, the wastewater used contains at least 0.1% by weight, particularly preferably at least 1% by weight, in particular at least 5% by weight, of HCl and preferably at most 25% by weight, particularly preferably at most 15% by weight of HCl.

Preferably, the wastewater is warmed in the first step to at least 20° C., particularly preferably at least 30° C., in particular at least 40° C., and preferably to a maximum of 90° C., particularly preferably a maximum of 80° C.

The warming preferably proceeds in a heat exchanger.

In the second step, the wastewater is preferably kept for at least 1 h, particularly preferably at least 2 h.

Preferably, the temperature which had been established in the first step is maintained.

The second step is preferably carried out in a container, for example in a storage container or stirred kettle. Preferably, in the second step, the wastewater is agitated, in particular stirred.

In the third step, the wastewater is passed through a phase separation element, whereby the fine droplets of organosilicon compounds that are water-insoluble with difficulty are separated off from the wastewater. Suitable phase separation elements are all demisters for separating off droplets from liquids. Here, phase separation elements that are known per se are used which are described, for example, in DE 113478, DE 2436080, DE 2804968. Preferably, coalescence separators are used.

The organosilicon compounds that are water-insoluble with difficulty that are formed accumulate, for example, as a light phase in the coalescence separator and can be separated off from the aqueous phase (wastewater) in the upper part of the coalescence separator.

The phase separation element preferably contains a fiber bed. In the phase separation element, the separation efficiency is primarily determined by the dimensioning such as length and thickness of the fiber bed, the material thereof, such as glass fiber, PTFE, PVDF, and also volumetric flow rate and residence time. After the wastewater flows through the phase separation element the phase of the organosilicon compounds accumulates in the upper region of the phase separation element and is separated off.

In the phase separation element, preferably a differential pressure of 0.05 bar is employed, particularly preferably at least 0.5 bar, in particular at least 0.1 bar, and preferably at most 1.5 bar, particularly preferably at most 1 bar.

The wastewater removed from the phase separation element after the third step can be fed to the wastewater treatment.

Since in most cases the separation of the organosilicon compounds is not complete after it is passed through the three process steps, the wastewater removed from the phase separation element after the third step can be treated again in the three steps in the method according to the invention as a total stream or as a substream. In this case, the first step can alternatively be omitted if the temperature of the wastewater is suitable for the second step.

Preferably, for carrying out the method according to the invention again, further devices, in particular a further container and a further phase separation element, are used.

The method described can be repeated in its three process steps until it is no longer possible to separate off the organosilicon compounds.

In the examples hereinafter, unless otherwise stated, all quantities and percentages are based on the weight, all pressures are 0.10 MPa (absolute) and all temperatures 20° C.

Example 1

Not According to the Invention

A wastewater of the methyl chloride plant was heated to and maintained at 40° C. The hydrochloric acid concentration of the wastewater was 1.5% by weight. By $^1$H-NMR, the content of methyl groups on silicon atoms was determined. The wastewater contained 900 mg/kg of $CH_3$—(Si). Phase separation material FTC III 750-G-N from Franken Filtertechnik KG P was clamped between two horizontally mounted glass columns. The filter surface area was 49 cm$^2$. 1 l/h of previously temperature-controlled wastewater was able to be metered through the filter material continuously using a membrane pump. The wastewater, after filtration, contained 850 mg/kg of $CH_3$—(Si).

Example 2

According to the Invention

Example 1 was repeated, but the wastewater was stirred for 4 hours in advance at 40° C. in a flask. A change could be established visually. The previously optically clear wastewater became turbid as a function of time. The wastewater thus made turbid was subsequently filtered as described in example 1.

A clear second organic phase was able to be separated. The wastewater, after filtration, contained 700 mg/kg of $CH_3$—(Si).

Example 3

According to the Invention

Wastewater was stirred in a flask at various hydrochloric acid concentrations for 30 minutes, 60 minutes, 120 minutes and 180 minutes at 40° C. and then filtered as described in example 1. The results are listed in the table:

|              | Temperature ° C. | Time min | HCl content in the wastewater ma % | $CH_3$—(Si) content in the wastewater mg/kg |
|---|---|---|---|---|
| Experiment 1 | 40 | 0   | 0.43 | 1085 |
|              | 40 | 30  | 0.43 | 985  |
|              | 40 | 60  | 0.43 | 961  |
|              | 40 | 120 | 0.43 | 958  |
|              | 40 | 180 | 0.43 | 920  |
| Experiment 2 | 40 | 0   | 5.5  | 1085 |
|              | 40 | 30  | 5.5  | 930  |
|              | 40 | 60  | 5.5  | 868  |
|              | 40 | 120 | 5.5  | 868  |
|              | 40 | 180 | 5.5  | 775  |
| Experiment 3 | 40 | 0   | 8.9  | 829  |
|              | 40 | 30  | 8.9  | 682  |
|              | 40 | 60  | 8.9  | 682  |
|              | 40 | 120 | 8.9  | 651  |
|              | 40 | 180 | 8.9  | 651  |
| Experiment 4 | 40 | 0   | 13   | 829  |
|              | 40 | 30  | 13   | 527  |
|              | 40 | 60  | 13   | 527  |
|              | 40 | 120 | 13   | 496  |
|              | 40 | 180 | 13   | 465  |

Example 4

According to the Invention

In a pilot-scale plant according to FIG. 1, wastewater polluted with organosilicon compounds was treated as described hereinafter:

In a 1st process step, the wastewater was conducted at a volumetric flow rate of 2500-7500 l/h through a heat exchanger WT(1) and heated to and maintained at 60° C.

In a 2nd process step, the wastewater passed into a 70 m$^3$ container B(2). In this container B(2), the wastewater remained over a period of 7 h. Within this time span, the reaction of short-chain to form long-chain organosilicon compounds took place. The reaction could be identified visually by precipitation of organosilicon compounds from the solution.

In a 3rd process step, the wastewater situated in the container B(2) was transported into the subsequent coalescer K(3) at a volumetric flow rate of likewise 2500-7500 l/h and at a temperature of 60° C. The physical separation proceeded in the total of four installed phase separation elements FTC III 750-G-N-S from Franken Filtertechnik KG. After flowing through the separation elements, the organosilicon phase S(4) accumulated in the upper region of the coalescer K(3) and was fed back to the production process.

Some of the inorganic aqueous phase A(5), which likewise still contained organosilicon components, was fed via a heat exchanger W(6) to a container B(7) and then to a coalescer K(8) (glass equipment). The remaining wastewater stream A(9) not conducted via the second coalescer K(8) was fed to a wastewater treatment system.

Alternatively, the part of the inorganic aqueous phase A(5) can be recirculated to the heat exchanger W(1).

Result: In the pilot-scale plant described, depletions or separation results of 1 to 4 l/h of organosilicon phase were achieved.

The invention claimed is:
1. A method for separating off organosilicon compounds dissolved in wastewater, said method comprising:
    a first step comprising
        maintaining wastewater at 10° C. to 90° C. for at least 30 minutes, and a second step comprising passing the wastewater through a phase separation element in which droplets that are formed in the first steps and which contain organosilicon compounds are separated off, wherein the wastewater contains at least 0.1% by weight of HCl and organosilicon compounds comprising dimethylsilanediol and polydimethylsiloxanes.

2. The method as claimed in claim 1, in which the wastewater is maintained at at least 30° C. in the first step.

3. The method as claimed in claim 1, in which the wastewater is agitated in the first step.

4. The method as claimed in claim 1, in which the phase separation element is a coalescence separator.

5. The method as claimed in claim 1, in which the phase separation element is operated at a differential pressure of 0.05 bar to 1.5 bar.

6. The method as claimed in claim 1, in which the wastewater removed from the phase separation element is recirculated as a total stream or as a substream for treatment again according to the method of claim 1.

7. The method as claimed in claim 2, in which the wastewater is agitated in the first step.

8. The method as claimed in claim 7, in which the phase separation element is a coalescence separator.

9. The method as claimed in claim 8, in which the phase separation element is operated at a differential pressure of 0.05 bar to 1.5 bar.

10. The method as claimed in claim 9, in which the wastewater removed from the phase separation element is recirculated as a total stream or as a substream for treatment again according to the method of claim 1.

* * * * *